UNITED STATES PATENT OFFICE.

LAUREN B. ARNOLD, OF GATES, ASSIGNOR OF TWO-THIRDS HIS RIGHT TO JOHN HIGGINS, OF BERKSHIRE, NEW YORK, AND JOHN T. ELLSWORTH, OF BARRE, MASSACHUSETTS.

IMPROVEMENT IN CHEESE-MAKING PROCESSES.

Specification forming part of Letters Patent No. 187,798, dated February 27, 1877; application filed February 4, 1876.

*To all whom it may concern:*

Be it known that I, LAUREN B. ARNOLD, of Gates, in the county of Monroe, State of New York, have invented an Improved Process for Making Cheese from skim-milk, of which the following is a specification:

The object of my invention is to increase the quantity and improve the quality of cheese made from skim-milk by an improved process in the manufacture thereof.

As soon as practicable after the milk is drawn from the cows, and before it has lost all its animal heat, if possible, it is to be heated without burning to from 130° to 180° Fahrenheit. It is then to be immediately cooled to from 50° to 60°, or even lower, if desired. I have attained the best results by heating the milk to 140°, and by then cooling it down to 54°, but a variation from these temperatures within the limits stated will not materially affect the result. It is best to stir or agitate the milk gently while it is being heated. A small quantity of milk will, after being heated, cool spontaneously, so as to remain sweet while the cream is rising, but if the milk be placed in any vessel where it is over four or five inches deep it should be cooled artificially. To accomplish this, the milk is put into vessels of tin or other material, and these vessels set into vats or tanks constantly supplied with cold water. The depth of the milk is not essential. A good form for the coolers is cylindrical, ten inches diameter by twenty inches deep, and they should be set in the water to nearly or quite the depth of the milk. The milk remains in the coolers immersed in cold water, or is otherwise kept cool for from twelve to forty-eight hours, according to the state of the weather. The morning's milk may always be kept to the next morning, and in most weather it may be kept to the second morning before removing the cream. The night's milk may always be kept until the second morning, and in cool weather until the third morning before it will become sour.

The cream is to be removed and churned while sweet, and the sweet buttermilk from the scalded milk is added to the skim-milk. The whole is then heated to the degree usual for adding the rennet, or a little above it— say, to 90°—the sweet buttermilk and rennet are added to it, and it is set for curd. After this it is treated in the usual manner, as for making cheese from new milk. Cheese made by this process is much better in flavor, texture, and curing properties than that obtained from skim-milk by the ordinary process.

What I claim is—

The herein-described process of making cheese from skim-milk, consisting, first, in heating and cooling the whole milk, as described, and, second, in adding to the sweet skim-milk the buttermilk from the scalded milk, and in subsequently treating the mixture as in making cheese from whole milk, substantially as described.

LAUREN B. ARNOLD.

Witnesses:
HENRY R. SELDEN,
GEORGE B. SELDEN.